(12) United States Patent
Tracy et al.

(10) Patent No.: US 8,272,594 B2
(45) Date of Patent: Sep. 25, 2012

(54) LAMINAR FLOW WING OPTIMIZED FOR SUPERSONIC CRUISE AIRCRAFT

(75) Inventors: Richard R. Tracy, Carson City, NV (US); Peter Sturdza, Atherton, CA (US); James D. Chase, Reno, NV (US)

(73) Assignee: Aerion Corporation, Reno, NV (US)

( * ) Notice: Subject to any disclaimer, the term of this patent is extended or adjusted under 35 U.S.C. 154(b) by 534 days.

(21) Appl. No.: 12/589,424

(22) Filed: Oct. 26, 2009

(65) Prior Publication Data

US 2011/0095137 A1    Apr. 28, 2011

(51) Int. Cl.
*B64C 3/38*    (2006.01)
(52) U.S. Cl. .......................................................... 244/36
(58) Field of Classification Search ................ 244/35 A, 244/35 R, 36, 198, 204, 45 R
See application file for complete search history.

(56) References Cited

U.S. PATENT DOCUMENTS

| | | | | |
|---|---|---|---|---|
| 2,709,052 A | * | 5/1955 | Berg | 244/35 R |
| 4,611,773 A | * | 9/1986 | Goldhammer et al. | 244/35 R |
| 4,834,617 A | * | 5/1989 | Wainauski et al. | 416/242 |
| 5,322,242 A | * | 6/1994 | Tracy | 244/36 |
| 5,518,204 A | * | 5/1996 | Tracy | 244/36 |
| 5,897,076 A | * | 4/1999 | Tracy | 244/117 A |
| 6,149,101 A | * | 11/2000 | Tracy | 244/130 |

FOREIGN PATENT DOCUMENTS

JP        1-141199        6/1989

OTHER PUBLICATIONS

Peter Sturdza, Valerie M. Manning, Ilan M. Kroo, Richard R. Tracy, "Boundary Layer Calculations Preliminary Design of Wings in Supersonic Flow", American Institute of Aeronautics and Astronautics, pp. 1-11, USA.

* cited by examiner

*Primary Examiner* — Tien Dinh
*Assistant Examiner* — Keith L Dixon
(74) *Attorney, Agent, or Firm* — William W. Haefliger

(57) ABSTRACT

A method of providing an aircraft having a fuselage and a wing configured for extensive laminar flow at design cruise conditions, the method characterized by a) providing wing biconvex-type airfoils having values of thickness, chord and shape along the wing span which provide substantially optimal aircraft range at design cruise conditions, considering the influences of wing drag and wing weight; b) providing wing leading edges, which are configured to effect laminar flow; c) providing fuselage and wing contours which, in combination, produce reduced total wave drag and produce extensive areas of laminar boundary layer flow on the wing; and d) providing wing sweep angularity that facilitates provision of a), b) and c).

37 Claims, 12 Drawing Sheets

NLF THICKNESS RATIO vs MACH NUMBER
DRAG RATIO = 0.5, LAMINAR FRACT. = 70%

OPTIMIZED RANGE BENEFIT OF THICKER WING

VELOCITY CONTOURS ON CIRCULAR LE SEGMENT AT MACH 1.35 & REYNOLDS NUMBER = 15,000 BASED ON LE HEIGHT.

0.012" dia round nose, MACH 1.35, Re/ft. 15M

PRESSURES ON CIRCULAR, ELLIPTICAL AND OPTIMIZED LE SEGMENTS AT MACH 1.35

THREE NOSE GEOMETRIES AND CORRESPONDING PRESSURE COEFFICIENTS MACH 1.35 = 15 M/ft.
NOTE: OPT. 1 WAS OPTIMIZED FOR MACH 1.2

Figure 9A:
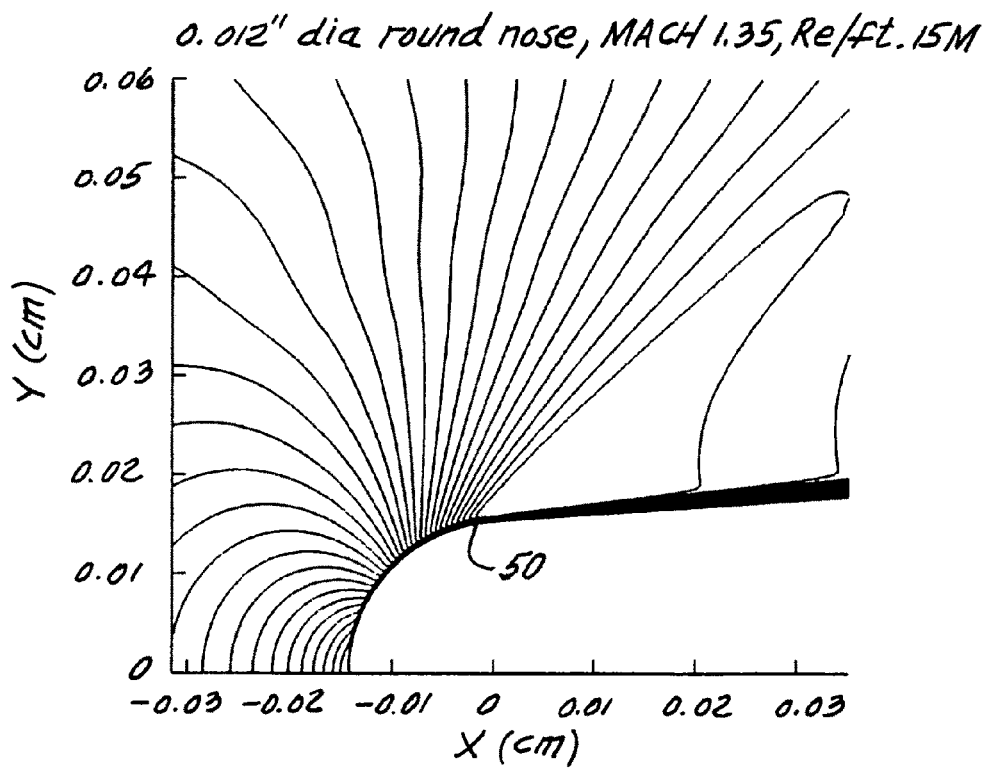
Figure 9B:
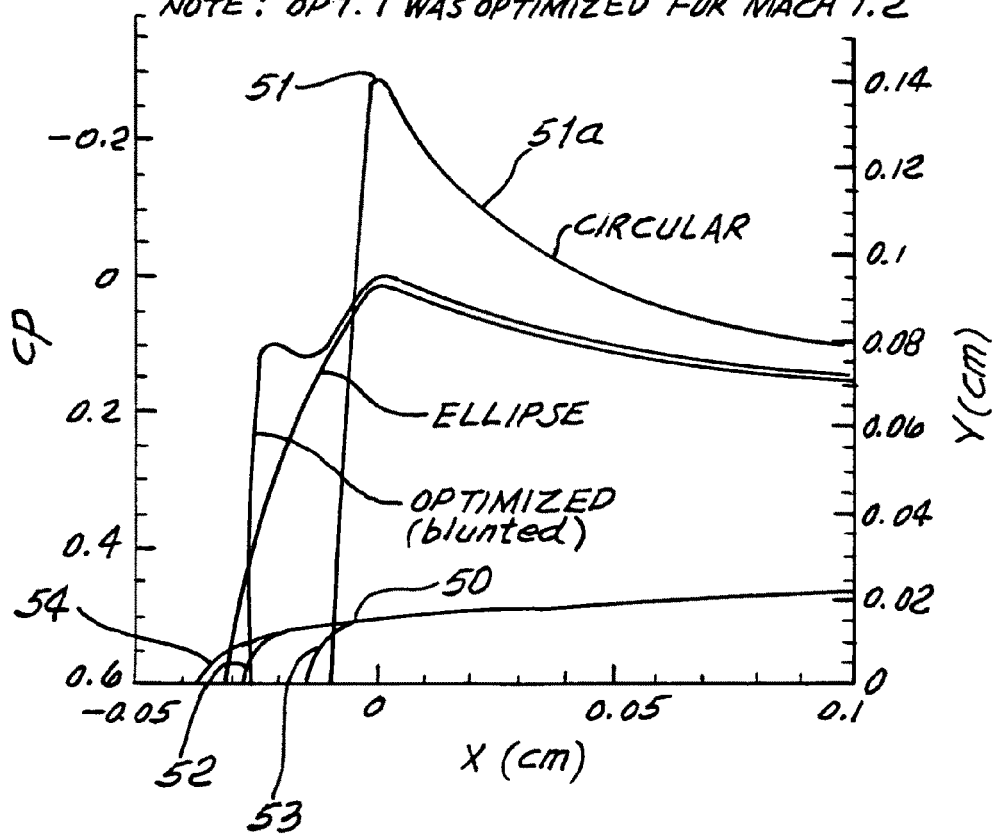
Figure 9C:
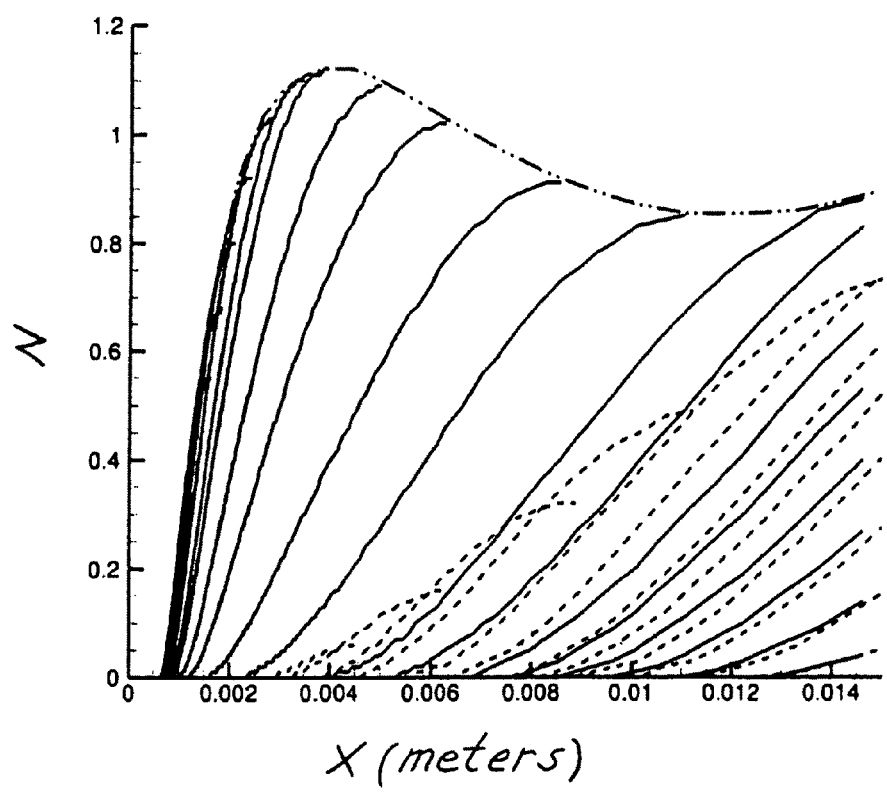

Fig. 9C. BL instability levels near the LE, as shown by the envelope of N-values for all frequencies versus chordwise distance from the LE., comparing circular segmnent LE (solid llines) and sharp LE (dashed) at Mach 1.35 and Reynolds number = 15,000 based on LE diameter.

INFRA-RED VIDEO FRAME DURING FLIGHT TEST OF BICONVEX NLF WING MODEL WITH CIRCULAR LE SEGMENT, AT MACH 1.8 AND 40,000 ft.

LOWER SIDE BEFORE OPTIMIZATION

LOWER SIDE AFTER OPTIMIZATION

UPPER SIDE BEFORE OPTIMIZATION

UPPER SIDE AFTER OPTIMIZATION

LAMINAR FLOW WING OPTIMIZED FOR SUPERSONIC CRUISE AIRCRAFT

BACKGROUND OF THE INVENTION

This invention relates generally to the design configuration of supersonic aircraft with wings designed for extensive natural laminar flow (NLF), and more particularly to optimization of wing thickness and fuselage cross section relationship criteria, for such supersonic aircraft.

Supersonic natural laminar flow wing configurations are desirable for efficient supersonic cruise. Principal features are low sweep, sharp (actually very thin) leading edge, and thin biconvex-type airfoils offering a supersonic cruise drag advantage as a result of reduced skin friction drag associated with NLF, which more than offsets increased drag due to thickness (volume wave drag). The importance of laminar boundary layer (BL) flow in terms of drag reduction can be seen from the fact that for typical supersonic cruise flight conditions the laminar skin friction drag is approximately a factor of ten less than turbulent skin friction drag associated with traditional supersonic swept or delta wing, for the same amount of surface area. The NLF wing also provides additional advantages over traditional supersonic swept or delta wings in cruise efficiency at high subsonic speeds, and in takeoff and landing performance. In addition the NLF wing can achieve its best efficiency at a substantially higher subsonic Mach number than that of the swept wings typically used on high speed subsonic aircraft.

The supersonic NLF wing must have low sweep and therefore incurs more volume wave drag (related to thickness) than a well-designed delta wing of similar size and thickness.

Thus, on a purely aerodynamic basis the low sweep NLF wing should be as thin as possible, to reduce the volume wave drag. On the other hand a thinner wing incurs a weight penalty, since structural weight increases as wing thickness decreases, so that selection of thickness to chord ratio (t/c) is a key to optimizing the performance of such aircraft.

Figure 6:
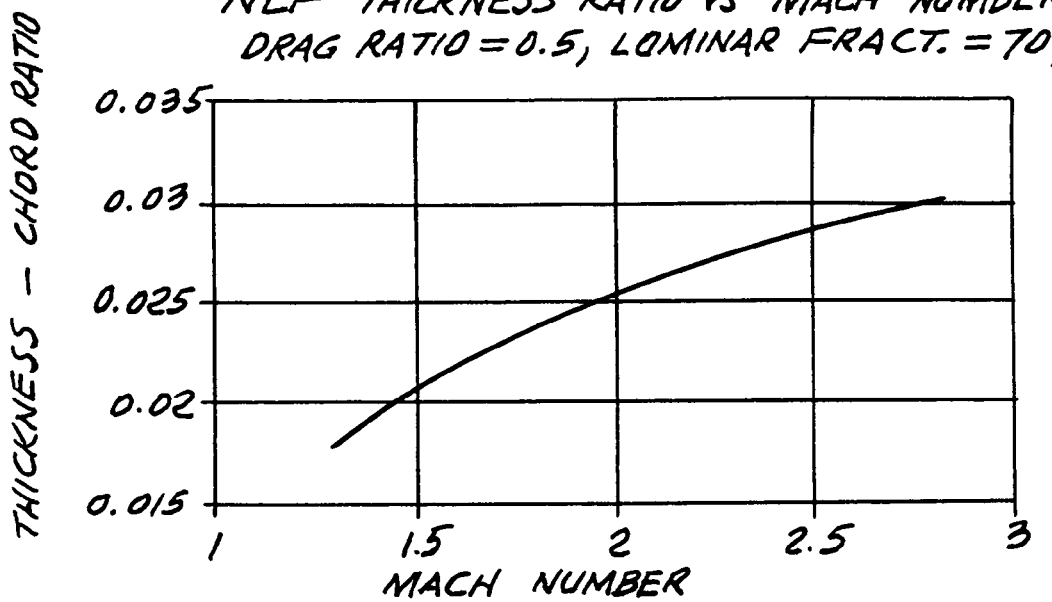

In our previous design studies, the wing was limited to thickness-chord ratios (t/c) for which the volume wave drag was appreciably less than the drag savings resulting from laminar skin friction vs turbulent skin friction. This consideration formed certain bases for U.S. Pat. Nos. 5,322,242, 5,518,204, 5,897,076, "High Efficiency Supersonic Aircraft", incorporated herein by reference. As will be shown, this criterion led to the selection of about 20 (0.02) as an upper limit for the average t/c of the wing, for the Mach 1.5 speed then being considered. As mentioned, these prior patents claimed a t/c less than about 2%, but specified no variation with design cruise Mach number, M. The curve of FIG. 6 is representative of that variation and can be approximated by, $$\frac{t}{c} \leq 0.02 \times \sqrt{M - 0.5}.$$

Nonetheless, a number of considerations drive the optimal thickness to higher values, even at the expense of more volume wave drag. For example the favorable pressure gradient, which stabilizes the laminar boundary layer, increases with wing t/c, and as noted, structural weight decreases with increasing thickness. In addition, the volume wave drag attributable to the wing can be reduced by contouring the fuselage in the vicinity of the wing. Finally, the achievement of NLF on large areas of the wing surface is dependent on (a) achieving appropriate pressure gradients over the affected surfaces of the wing and (b) suitable leading edge size and shape. These pressure gradients depend not only on the local airfoil shapes, but also are significantly influenced at supersonic speeds by the fuselage contours adjacent to, and forward of the wing. There is, accordingly, need for improvements in such aircraft, and particularly in the optimization of the biconvex-type airfoil shape and thickness, as well as the fuselage contours affecting both volume wave drag and NLF extent over the wing surfaces.

SUMMARY OF THE INVENTION

The present invention concerns optimization of wing thickness, airfoil shapes and fuselage contours using 3-dimensional non-linear aerodynamic codes and improvements in computational optimization techniques as applied to complete aircraft configurations. One unexpected result is that the optimum wing thickness-chord ratio and its variation over the span needs to be substantially redefined. As will be seen the resultant supersonic wing embodies greater t/c ratios than previously proposed, and the associated fuselage is shaped according to criteria not previously proposed for conventional supersonic aircraft. We have shown in a previous technical paper, AIAA-99-3104, "Boundary Layer Calculations for Preliminary Design of Wings in Supersonic Flow", by P. Sturdza, V. Manning, I Kroo, and R. Tracy, incorporated herein by reference, that undesirable span-wise pressure gradients and associated boundary layer cross-flows on an NLF wing can be limited to acceptable levels by localized fuselage shaping at the wing leading edge intersection with the fuselage. As will be seen, the shaping disclosed herein includes not only the fuselage near the wing leading edge but also areas relatively distant from this intersection.

Another object is to provide values of airfoil thickness, chord and shape along the wing span which provide substantially optimal aircraft range at design cruise conditions, wherein the values of airfoil thickness, chord and shape along the wing span as determined by the following considerations:
  i) a process in which the aircraft drag and weight, and resulting aircraft range are determined for a number of airfoil variations, and
  ii) other aircraft characteristics.

Such other aircraft characteristics include manufacturing cost, operating cost, equipment installation, ease of access and maintenance. Also such characteristics may include aircraft range at speeds other than the design cruise Mach number, such as for example high subsonic speeds; and/or may include aircraft fuel efficiency for a particular mission or selected mix of missions; and/or may include aircraft landing and takeoff performance, and handling qualities associated therewith.

An additional object is to provide an improved wing with biconvex-type airfoils having at each spanwise location a ratio t/c of maximum thickness t to chord c, wherein the average of the selected t/c ratios along the span are dependent on the selected design Mach number. For example, as will be seen, the maximum optimized wing thickness to chord ratio outboard of a zone of fuselage influence as defined below, expressed as an average along the span, is defined to be limited as indicated by, $$\frac{t}{c} \leq 0.24 \times \sqrt{M},$$

where M=the design cruise Mach number. The zone of fuselage influence is the area of the wing near the wing to fuselage junction where the volume wave drag of that portion of the wing can be partially offset by fuselage tailoring, that is by locally reducing the fuselage cross section area. Such tailoring or "area-ruling" is known in the industry, and was previously described in combination with the 2% t/c NLF wing in U.S. Pat. No. 6,149,101, incorporated herein by reference. For the present purposes, this zone is defined at the lowest supersonic design cruise Mach number, M, and is the portion of the wing inboard of a wing station defined by the intersection of Mach lines originating at the intersection of the extended leading and trailing edges of the wing and the plane of symmetry. Mach lines are defined as having an angle relative to the flight direction equal to arcsine of 1/M.

In accordance with the foregoing formula, such a wing has optimum wing thickness to chord ratio as an average along the span outboard of fuselage influence, of less than about 0.027 for a design supersonic cruise speed of Mach 1.3, increasing nearly linearly with increasing Mach number to less than about 0.040 for a design cruise speed of about Mach 2.8. These Mach numbers are not limiting but rather illustrative.

The shaping of the portion of the wing in the zone of fuselage influence, and contouring the fuselage itself in the vicinity of the wing, are critical to the overall performance and design optimization in accordance with two primary considerations. The first is reduction of volume wave drag of the combined wing-fuselage system, while the second is reduction of skin friction drag on the wing by increasing its extent of laminar flow. The latter is a function of the pressure distribution on the wing, which depends upon both the local airfoil shapes and the fuselage shape adjacent to and forward of the wing in supersonic flight. The pressure gradients on the wing outboard of the fuselage zone can either facilitate NLF on the wing surface or suppress it, depending on whether such pressure gradients are respectively "favorable", "adverse" or "crossflow", as such terms are understood in the art. The object of the design optimization is to develop wing shapes in combination with fuselage shapes which minimize the sum of wave drag plus skin friction drag, noting that the skin friction drag of the wing depends on the amount of its surface characterized by low drag laminar flow. The remainder of the wing, as well as most of the fuselage, has higher skin friction drag, associated with turbulent flow. For an aircraft whose design goal is maximum range, this shaping is done for several selected wing thickness distributions along the span, each such thickness distribution having a corresponding wing weight, so that the overall design optimum can be determined taking into account both drag and weight in determining the aircraft range. It is well understood in the art that increasing empty weight for a given aircraft gross takeoff weight offsets fuel weight and thereby reduces range.

These and other objects and advantages of the invention, as well as the details of an illustrative embodiment, will be more fully understood from the following specification and drawings, in which:

DRAWING DESCRIPTION

Figure 1:
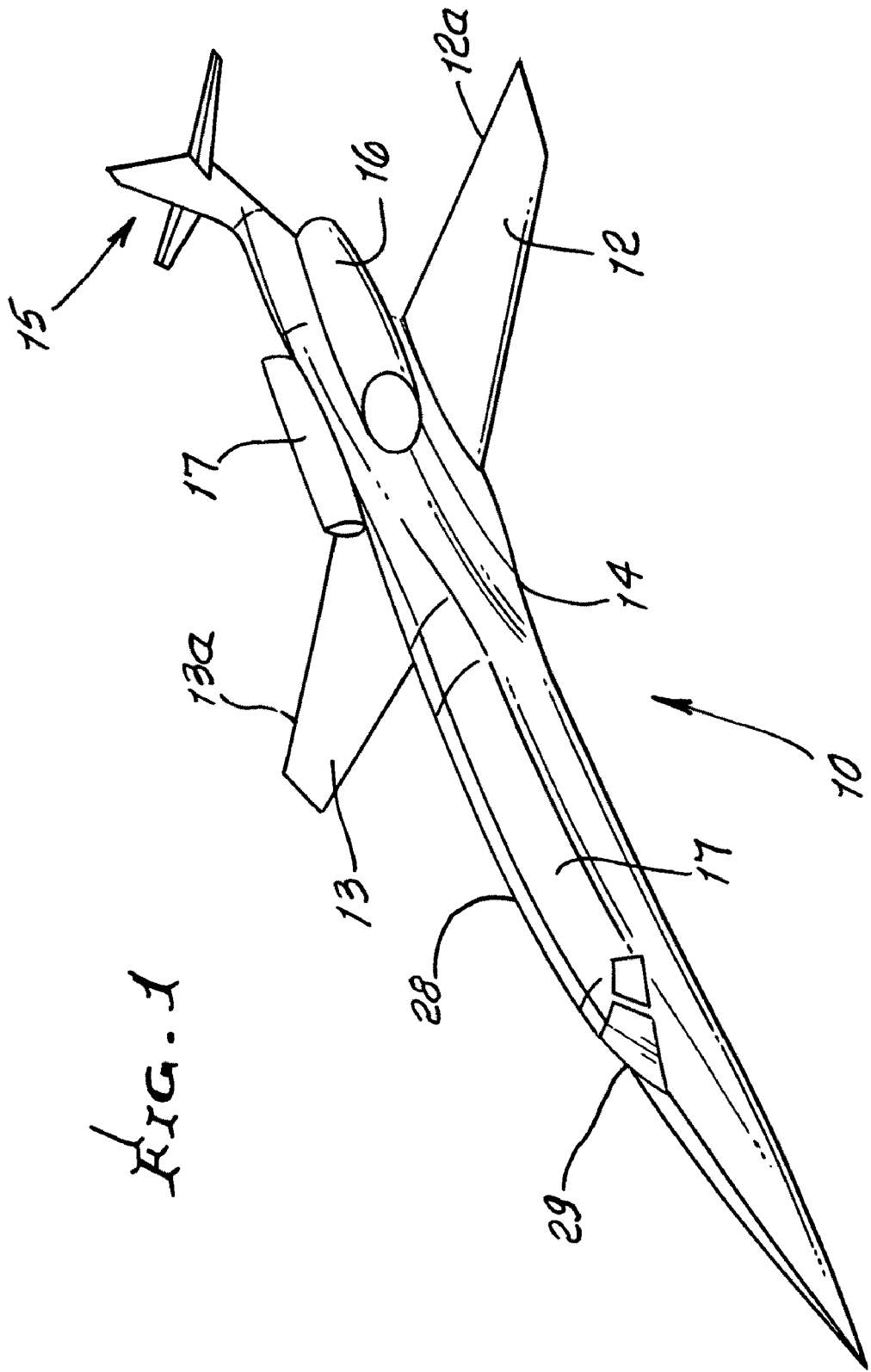
Figure 2:
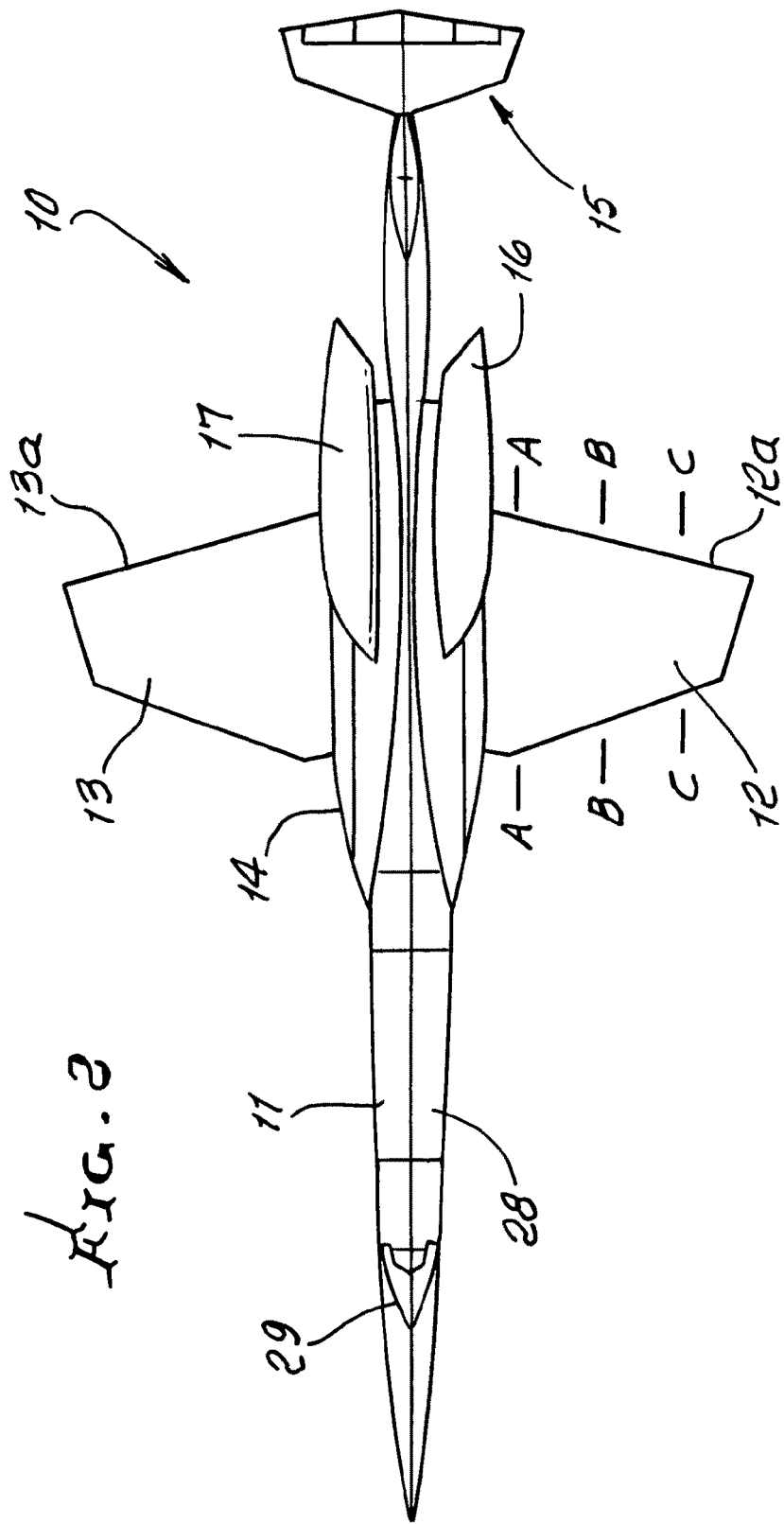
Figure 3A:
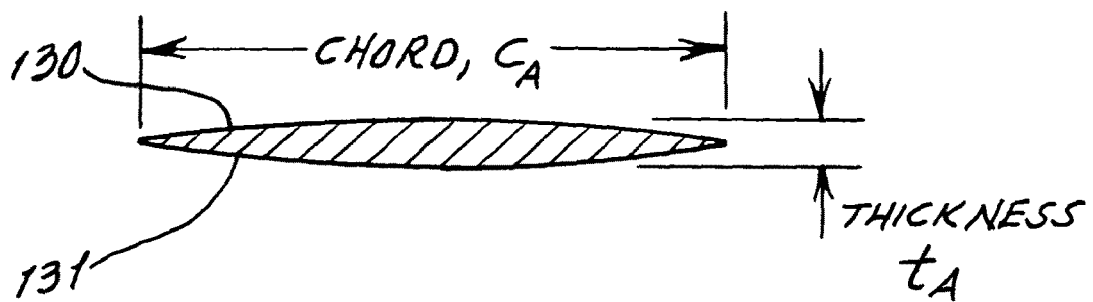
Figure 3B:
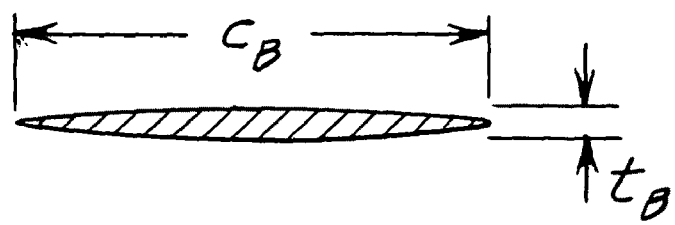
Figure 3C:
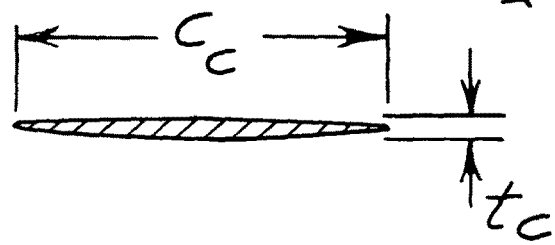
Figure 4:
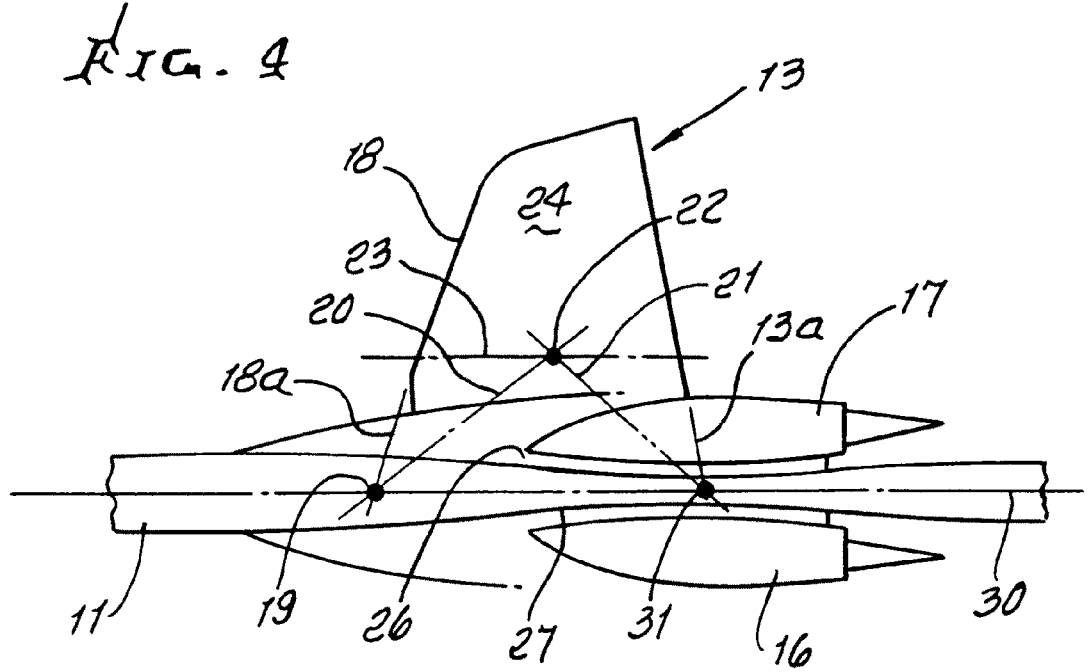
Figure 5:
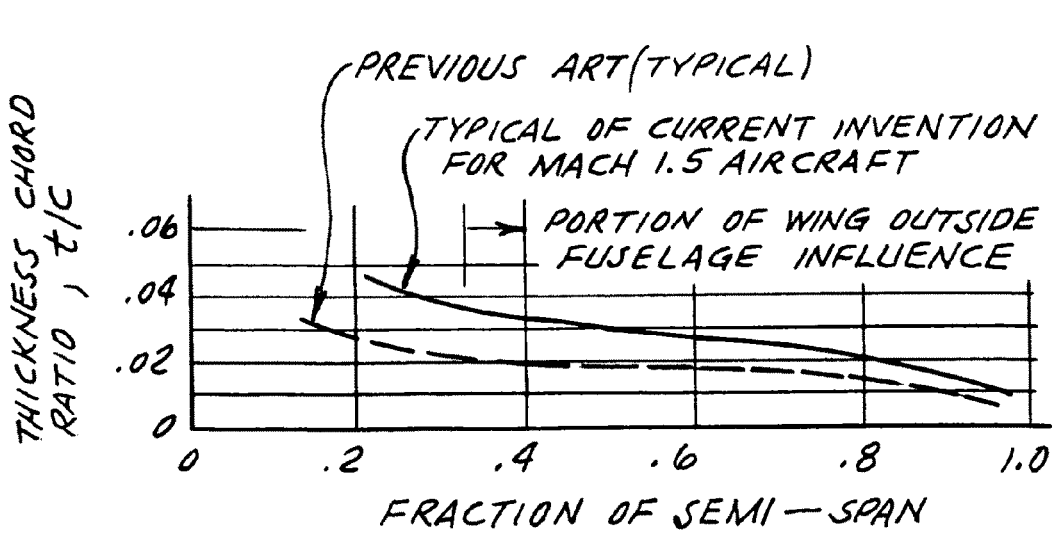
Figure 7:
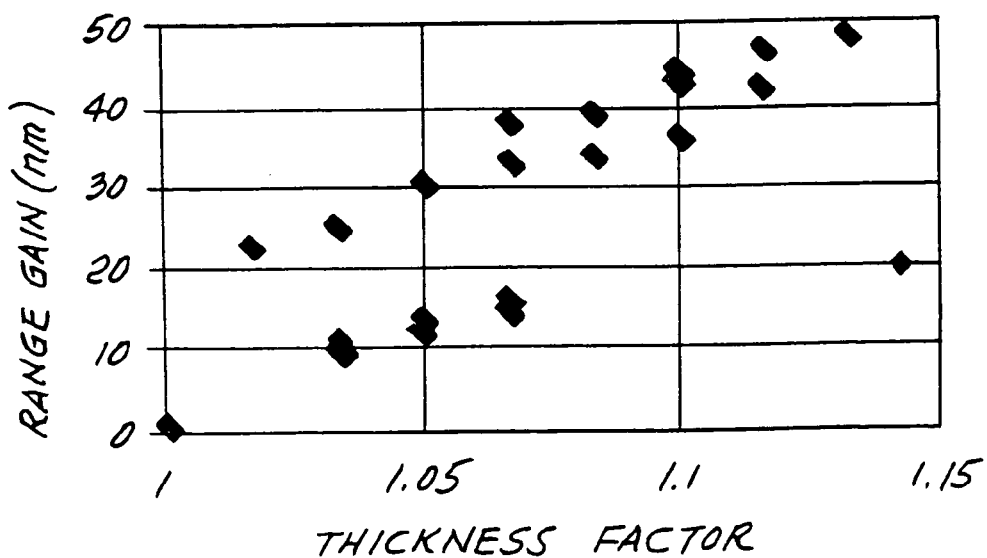
Figure 8:
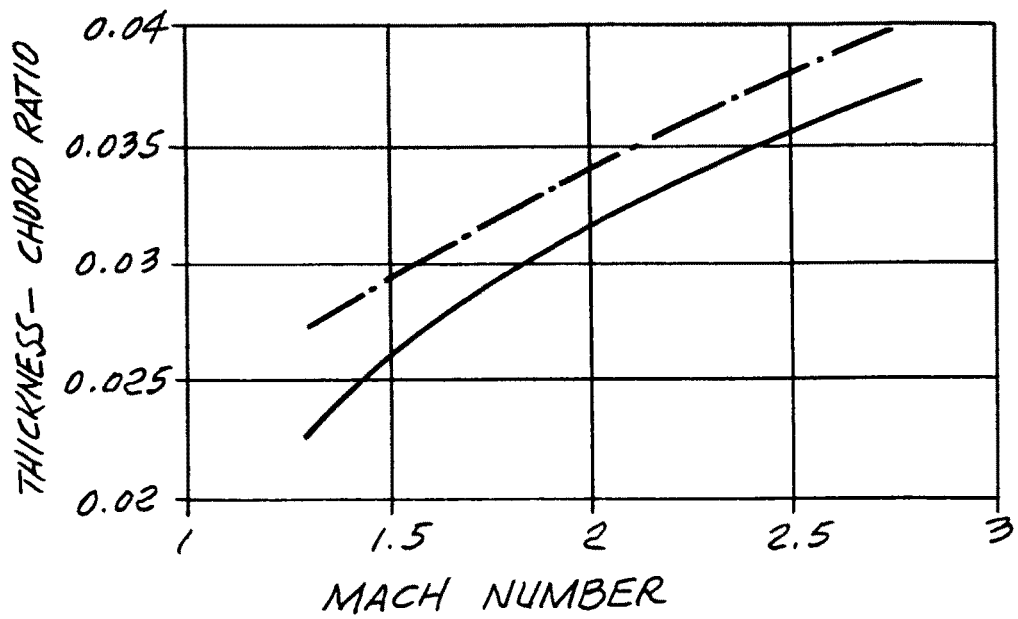
Figure 9D:
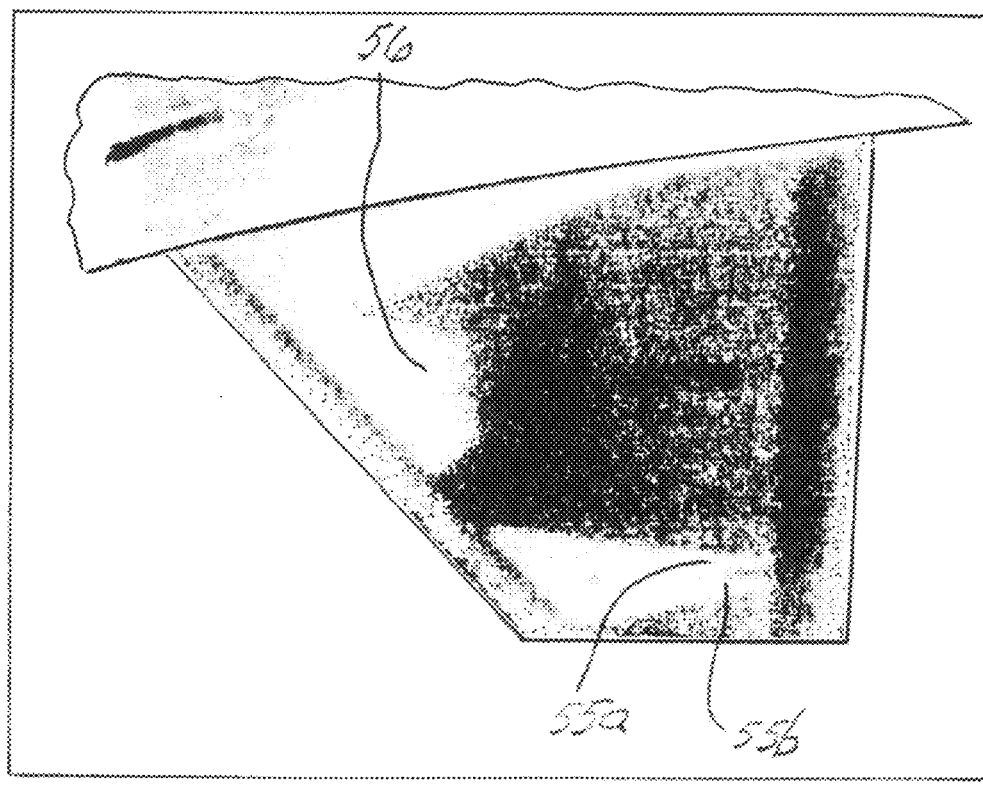

FIG. 1 is a perspective view of a supersonic aircraft;
FIG. 2 is a plan view of the FIG. 1 aircraft;
FIGS. 3a, 3b and 3c are chordal cross sections taken on lines A-A, B-B and C-C in FIG. 2;
FIG. 4 is a fragmentary plan view of a wing at its attachment to the fuselage showing fuselage influence;
FIG. 5 is a graph;
FIG. 6 is a graph;
FIG. 7 is a graph;
FIG. 8 is a graph;
FIGS. 9A and 9B are representations of pressure distributions on various wing leading edge shapes, FIG. 9C is a graph of stability (N-factors) associated with one leading edge shape, and FIG. 9D is a photo of a partial wing in flight test; and
FIGS. 10A-10D are representations of pressures and boundary layer transition locations on a wing-fuselage-strake combination.

DETAILED DESCRIPTION

In FIGS. 1 and 2, the supersonic aircraft 10, has a fuselage 11, wings 12 and 13, strake 14, and tail 15. Two engine nacelles 16 and 17 are located at opposite sides of the fuselage, and project rearwardly of the wing trailing edges 12a and 13a. A cabin and cockpit are shown at 28 and 29, respectively.

FIGS. 3a, 3b and 3c show wing biconvex surfaces 130 and 131, along the span. See also airfoil chord C and thickness dimension t as follows:

$C_A$ and $t_A$, at A-A
$C_B$ and $t_B$, at B-B
$C_C$ and $t_C$, at C-C

FIG. 4 shows the wing-fuselage intersection region, in which the trailing edge line 13a intersection with the fuselage center line 30 is indicated at 31; and the wing has a leading edge 18, with projected edge line 18a intersection with the fuselage center line indicated at 19. Mach lines 20 and 21 projected from 19 and 31 respectively intersect at 22. A chord line 23 intersects 22, as shown. The wing extent 24 outboard of chord line 23 is considered to be outboard of the fuselage zone of influence. The fuselage is indented along concave lines or edges 26 and 27, at its opposite sides.

It has previously been found that thicker wing sections can be employed near the fuselage without incurring the full drag penalty by reducing the fuselage cross section (area-ruling) to compensate for a portion of the wing volume at the corresponding longitudinal station. For example, a portion of the inboard wing can be substantially thicker than the maximum average t/c criteria given above (0.027 at Mach 1.3 increasing to 0.040 at Mach 2.8), without incurring a proportionate volume wave drag penalty as long as the fuselage cross section is tailored to compensate for the increased wing thickness inboard. Methods for addressing and quantifying these trade offs were also addressed in U.S. Pat. No. 6,149,101, "Aircraft Wing and Fuselage Contours", mentioned previously.

Recent advances in optimization methods, have enabled evaluation of the effect on parameters such as wing structural weight of the increase in maximum t/c, wing thickness variation along the span, airfoil profiles and wing plan view shape. Such evaluations have employed the selection of optimum wing and fuselage shapes to minimize the combined wave drag and skin friction drag, including the effect of pressure gradients on the NLF extent on the wing, as mentioned previously. Such shapes are considered aerodynamically optimized, but the overall design optimization must include the effect of spanwise distribution of wing thickness on weight, such that the greater aerodynamic drag penalty of a thicker wing is offset by its reduced weight.

Additional factors argue for even greater wing thickness at a given Mach number. For example a thicker wing can carry more fuel, which would otherwise require more fuselage volume. In addition, since a thicker wing has less weight for the same strength and stiffness, it is less costly to manufacture. There are also less quantifiable advantages of greater thickness such as greater space for flap and control actuators, landing gear, etc. FIG. 5 illustrates such greater thickness for the case of a wing designed for Mach 1.5. The lower curve is representative of the prior art referenced above, with an average t/c outboard of the zone of wing influence of less than about 2%, while the upper (solid) curve is indicative of the presently proposed t/c optimization results.

The NLF wing configuration proposed herein is also applicable to aircraft designed for higher Mach number, and it can be shown that increasing the design cruise Mach number permits greater optimum t/c. FIG. 6 is an example of this effect showing the variation with Mach number of the thickness-chord ratio of a biconvex airfoil with 70% laminar fraction, for which the volume wave drag plus friction drag is 50% of the turbulent friction drag of an airfoil with zero volume wave drag (defined for this discussion as a Drag Ratio of 50%). The assumption of zero volume wave drag is an optimistic idealization of a highly swept or delta wing, and is accordingly conservative for the present purposes. FIG. 6 also shows the basis for the previously mentioned selection of about 2% as a limit for t/c at Mach 1.5.

FIG. 7 shows the effect on predicted range for a generic NLF aircraft configuration at Mach 1.5 cruise speed of several variations of wing t/c ratios as a function of span, when the effect of thickness on wing weight is included in the optimization. The baseline (thickness factor equals 1) for comparison is a design which has been aerodynamically optimized for Mach 1.5, but with fixed wing weight. It has a t/c of about 0.02 as an average over the span outboard of the zone of fuselage influence. Each point on the graph of FIG. 7 represents a re-optimized design, with particular t/c variation along the span. The "thickness factor" for each point represents the ratio of the average of the re-optimized t/c distribution along the span outboard of the fuselage influence zone vs that of the "baseline" wing. Each point includes the effect of re-optimized fuselage contouring and wing airfoil shapes on both wave drag and friction drag (including the laminar fraction of the wing), as well as wing weight variations associated with the thickness changes. The thickness increase is the average along the span outboard of the zone of fuselage influence as described previously. Clearly the optimum average thickness is greater than the baseline t/c of 0.02, outboard of the zone of fuselage influence, even for this relatively low Mach number. And it must be noted that this optimum ignores the effects of manufacturing cost, fuel volume, equipment location and access, etc., all of which argue for still greater thickness.

The conclusion is that the optimum t/c depends on several factors as described above, and is appreciably greater than purely aerodynamic considerations would suggest. FIG. 8 shows the estimated upper limits of beneficial thickness-chord ratio averaged over the span outboard of the zone of fuselage influence, resulting from the combination of the quantifiable effects of aerodynamic drag and structural weight, plus less quantifiable effects such as fuel volume and actuator space, versus Mach number. The lower curve is the variation with Mach number of the t/c ratio for an NLF airfoil with 70% laminar flow and a Drag Ratio of 1.0 (NLF wing volume wave drag plus skin friction drag equal to the friction drag of a fully turbulent, zero thickness idealized swept or delta wing) at a representative Reynolds number. This curve is used as a surrogate for the combination of quantifiable effects on optimal t/c. The upper curve (broken line) represents the upper limit for an advantageous NLF wing, after taking into account the estimated effects of the previously mentioned non-quantifiable benefits of thickness. FIG. 8 thus indicates variation with Mach number of two criteria for maximum wing thickness: (a) lower curve: estimated quantifiable effects on upper limit of t/c for the outboard portion of an optimized NLF wing, represented by an airfoil with 70% laminar flow whose zero lift drag equals that of a fully turbulent zero-thickness airfoil, and (b) upper curve: estimated upper limit of t/c for an optimized NLF wing, taking into account effects of both quantifiable and non-quantifiable benefits of thickness. This upper curve limiting t/c is defined by the formula:

$$\frac{t}{c} \leq 0.024 \times \sqrt{M}.$$

Accordingly, for the lowest supersonic cruise speed shown of about Mach 1.3, the optimum wing thickness, as a span-wise average outboard of the zone of fuselage influence, is estimated to be equal or less than about 0.027, increasing approximately linearly with Mach number to about 0.040 at a design cruise speed of Mach 2.8. As mentioned previously, these Mach numbers are not limiting but rather illustrative.

The specific optimum thickness for each particular configuration depends on a number of design parameters, to be determined by performing an appropriate multi-disciplinary optimization. It must be emphasized that this optimization includes not only variations in airfoil and fuselage contours in the immediate locale of the wing as described in our prior patents, but also variations in fuselage contours over much of the length of the fuselage forward of the wing leading edge. In addition, the optimum thickness distribution requires not only the aerodynamic and weight optimization of both wing and fuselage contours in selecting the wing thickness distributions as explained above, but also accounting for the effects of the other less quantifiable factors affecting product value and economics as explained previously. The final design will necessarily also take into consideration operation at high subsonic speed where the NLF wing has efficient cruise much nearer Mach 1 than the swept wings typically designed for subsonic aircraft. Such operation near Mach 1 is part of all mission profiles, which generally require some subsonic cruise as well as acceleration through Mach 1. Further consideration in wing design must also be given to aircraft performance at takeoff and landing, which can affect final selection of parameters such as wing area and span, among others.

Wing leading edge (LE) size and shape are important in initiating, or effecting laminar flow for a supersonic NLF wing of the type considered. Any suitably designed LE has little effect on LF extent over the majority of the wing surface. On the other hand an incorrect LE design can cause immediate loss of LF which precludes any LF over the downstream surfaces. An extremely thin, or even knife-sharp LE is desirable from an aerodynamic standpoint, but is difficult to make and impractical in service. In addition, precisely controlling LE profile shape becomes increasingly difficult as its thickness is reduced. On the other hand, an excessively large LE becomes a significant contributor to wave drag and also can trigger premature transition from laminar to turbulent flow at or near the LE from either of three mechanisms: (1) stagnation line instability associated with the span-wise flow along the LE, (2) so-called Tollmien-Schlicting (T-S) instability caused by a local adverse pressure gradient immediately downstream of the LE, or (3) boundary layer separation if the adverse pressure gradient is sufficiently severe. Thus the shape and size of the leading edge is an important factor in NLF wing design for supersonic aircraft. (The present invention is restricted to low sweep wings with relatively sharp leading edges, so transition associated with cross-flow instability caused by LE pressure gradients is not an issue.) In order to minimize local adverse pressure gradients (a zone of increasing pressure with downstream distance) the NLF wing LE desirably should be smooth in the sense of not having corners or abrupt changes in curvature. An example is a circular segment LE (in planes normal to the direction of LE elongation) which is tangent to the forwardmost upper and lower surfaces of the biconvex-type airfoil. In this case there is no external corner, but a sudden change in curvature at the tangency of the very small radius of the circular segment LE to the much larger radius of the biconvex surfaces. An elliptical segment LE which is tangent to the upper and lower biconvex surfaces has reduced change in radius at the loci of tangency, and is generally considered a good leading edge, both from the standpoint of drag and NLF. However the elliptical segment LE has smaller radius at the nose of the LE than the circular segment LE and thus is more prone to damage. Other preferred LE shapes have a pressure distribution as favorable to NLF as the elliptical type, but a blunter forward face than either the elliptical or circular types for a given LE thickness, and thus would be more robust in service. However such a shape has more drag for a given size than either circular or elliptical types and presents more fabrication difficulty. A further consideration is the propensity of various LE shapes and sizes to accumulation of particulates and insect remains, and their effects on NLF. LE selection must take into account all of the above considerations.

FIG. 9A shows the result of an analysis of a circular segment LE at Mach 1.35 and Reynolds number of 15,000, based on free stream unit Reynolds number (15,000,000/ft) times LE diameter (0.012 in=0.001 ft). The point of tangency between the circular segment and upper surface of the biconvex airfoil is shown at 50.

FIG. 9B shows the pressure distributions of three convex LE shapes at Mach 1.35, i.e., a circular segment 53, an elliptical segment with 3:1 major to minor axis ratio, 52, and an optimized (blunted nose) shape 54. The relatively large suction peak 51 and strong adverse gradient 51*a* associated with the circular segment LE pressure distribution contrasts with the less severe pressure distributions of the elliptical segment LE and that of an optimized LE with blunted nose. Note that in the lower portion of the graph in FIG. 9B, the illustrated blunted leading edge 52 extends optimally in a forward direction between circular 53 and elliptical 54 leading edge segments, and wherein all of said leading edges are tangent to substantially the same biconvex surface portion or portions of the airfoil at 50.

Detail examination of the velocities near the surface downstream of the tangency point 50 of a circular segment LE for the stated conditions indicates that the BL is on the verge of separating due to the local adverse pressure gradient described above. Separation is unacceptable since a separation length of even a few millimeters can cause BL transition and loss of NLF over the entire wing chord downstream of that point.

The pressures associated with these shapes also have been analyzed and are found to be compatible with NLF up to relatively large size for typical supersonic cruise flight conditions. For example, FIG. 9C illustrates the T-S instability levels calculated for the BL on a circular segment LE under conditions similar to those above, namely Mach 1.5 and ReLE=15,000. The instability levels for selected frequencies are represented by the so-called N-factor, the logarithm of unstable growth of BL disturbance amplitude at each point along the BL, as a multiple of the neutral disturbance amplitude. Based on numerous tests, it is generally accepted that the BL is expected to remain laminar for T-S N-factors less than about 9, and the envelope of the solid line amplification curves in FIG. 9C is seen to be well within that limit. In summary, for the LE to initiate, or effect NLF, it is essential that it not cause larger than critical values of the N-factor, nor BL separation. FIG. 9C also provides a comparison between the circular segment LE and a perfectly sharp LE. The circular LE has higher N-values very near the LE, but a few millimeters downstream the N-values approach those for the ideal sharp LE, showing that the LE effect is unimportant as long as it doesn't cause premature transition to turbulence near the LE.

At typical supersonic cruise conditions of Mach 1.5 and 47,000 ft, the unit Reynolds number is about 2,000,000 per ft. The forgoing analysis suggests a safe LE Reynolds number, ReLE, of up to about 15,000 based on diameter for a circular segment LE. For the above typical cruise condition this corresponds to a LE diameter of about 0.09 inches. Much larger circular segment LE could risk separation and loss of NLF. However, shapes with less abrupt change of radius would have reduced adverse pressure gradient as seen in FIG. 9B, and thus less likelihood of separation even at larger sizes. In such cases a somewhat larger size would have acceptable BL stability and thus would also satisfactorily initiate, or effect NLF.

The risk of stagnation line instability increases with LE size and sweep. Calculations made for LE diameters being considered above, and the low sweep associated with the type of NLF wing being considered show that there is no risk of stagnation line instability at typical cruise conditions, even for much larger size. Thus stagnation line instability is generally not a limiting factor in selection of LE size and shape for the type of wing under consideration.

FIG. 9D shows one frame of an infra-red video obtained during supersonic flight tests at up to Mach number 1.8 and 40,000 ft altitude of a subscale half-wing (46 inch root chord, 20 inch tip chord, 31 inch semi-span) with a nearly circular segment LE varying from 0.06 to 0.09 inch thickness. The unit Reynolds number of the test is about twice the level mentioned above as typical for supersonic cruise. The light areas are cooler surfaces with laminar BL and the dark grey warmer areas have turbulent BL. The two grey triangles at 55*a* and 55*b* near the LE at the tip are caused by "trips" intentionally placed to cause distinctive "turbulent wedges", which confirm the laminar flow elsewhere. The predicted BL instability levels using the N-factors mentioned above, agreed well with the test results, such as the localized area of turbulent BL indicated by the lighter area at 56. A large number of such tests have been conducted, and none showed premature loss of NLF as a result of any of the LE effects described above. These flight tests and some LE analyses were conducted at speeds up to about Mach 2, both of which indicate that the allowable ReLE increases with Mach number. Thus the LE Reynolds number criterion of 15,000 is conservative, both for Mach numbers above 1.35, and for smoother shapes than circular.

An estimate of the effect on wave drag of a given size LE can be made by calculating LE drag coefficient Cdh based on LE effective thickness, h. Effective thickness is defined as the thickness at the points of tangency of the LE segment and the upper and lower biconvex-type wing surfaces. In terms of the more usual drag coefficient based on local wing chord, c, the leading edge drag is (h/c) times Cdh. For a circular segment LE, the drag coefficient Cdh is near unity for supersonic Mach numbers, so its LE drag coefficient based on local chord, CdLE, is about h/c. According to linearized supersonic flow theory, the volume wave drag of a circular arc airfoil is, $$Cd_{vol} = \frac{16}{\pi} \times \left(\frac{t}{c}\right)^2 \div \beta,$$

where, $$\beta = \sqrt{(M^2 - 1)}.$$

Thus the LE drag as a fraction, F, of the volume drag of a biconvex airfoil is about, $$F = Cd_{LE}/Cd_{vol} = \frac{\pi \times \beta}{16} \times \frac{h}{t} \div \frac{t}{c}.$$

Using the equation proposed previously for maximum estimated wing thickness as a function of Mach number, the leading edge height can be expressed in terms of LE drag fraction, F, approximately as, $$\frac{h}{t} \leq 0.12 \times F \times \sqrt{\frac{M}{M^2 - 1}}.$$

If the leading edge drag fraction, F, is restricted to less than one third (33%) of the biconvex airfoil volume wave drag, then the maximum h/t would be approximately, $$\frac{h}{t} \leq 0.04 \times \sqrt{\frac{M}{M^2 - 1}}.$$

The above maximum LE effective thickness ratio, h/t, ranges from about 0.045 at Mach 1.3, to about 0.025 at Mach 2.8. Less thickness would have lower drag and less risk of adversely affecting NLF, assuming the practical considerations of manufacture and operation are satisfied.

For example, a wing with LE effective thickness of 0.1 inches and airfoil thickness of 6 inches (typical for a mean chord of 20 feet and t/c of 2.5%) at Mach 1.4 (beta=about unity) would have a LE drag ratio, F of 13%.

As a more typical example of a thin circular segment LE, assume the LE drag fraction, F is limited to 3% of the volume drag of the same 2.5% biconvex airfoil with 20 ft chord at Mach 1.4, then h/t is about 0.0043, and h is about 0.026 inch.

Figure 10A:
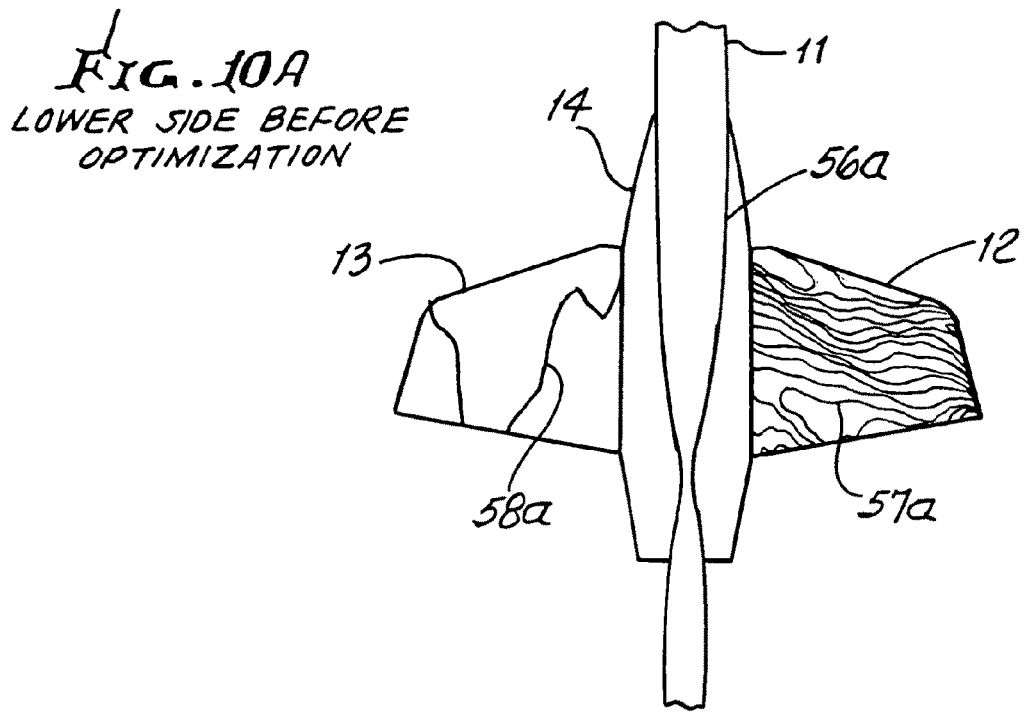
Figure 10B:
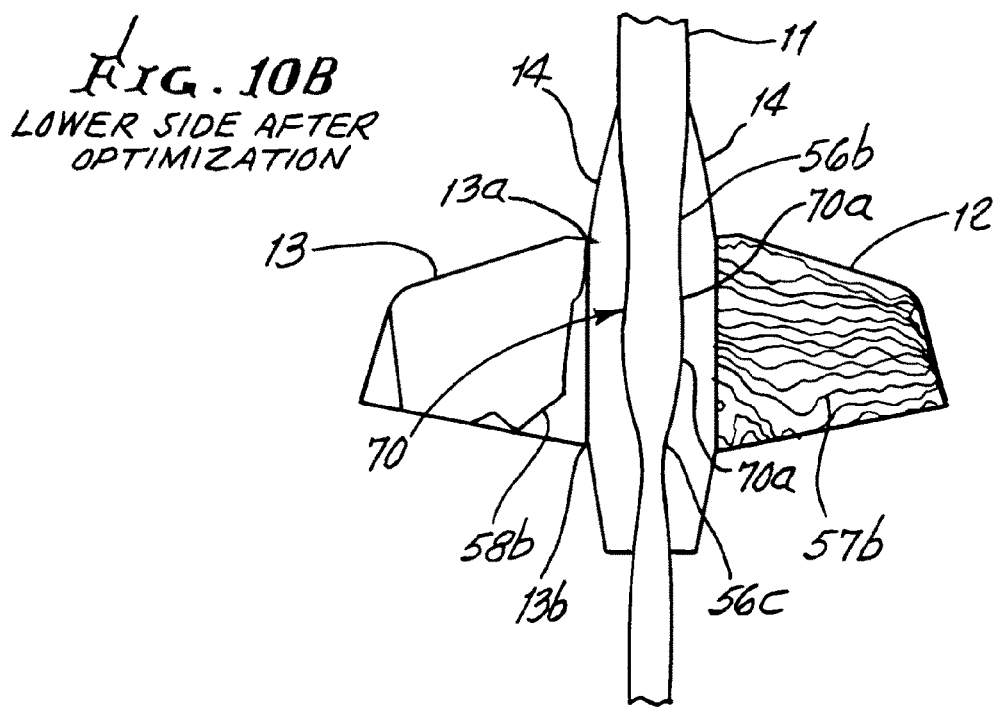
Figure 10C:
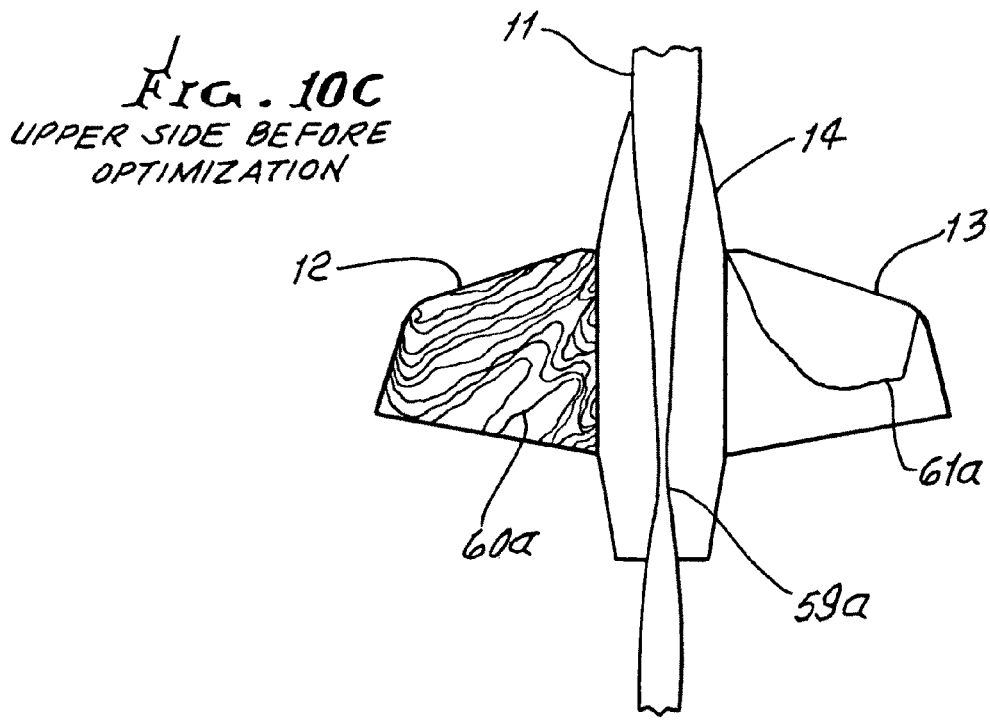
Figure 10D:
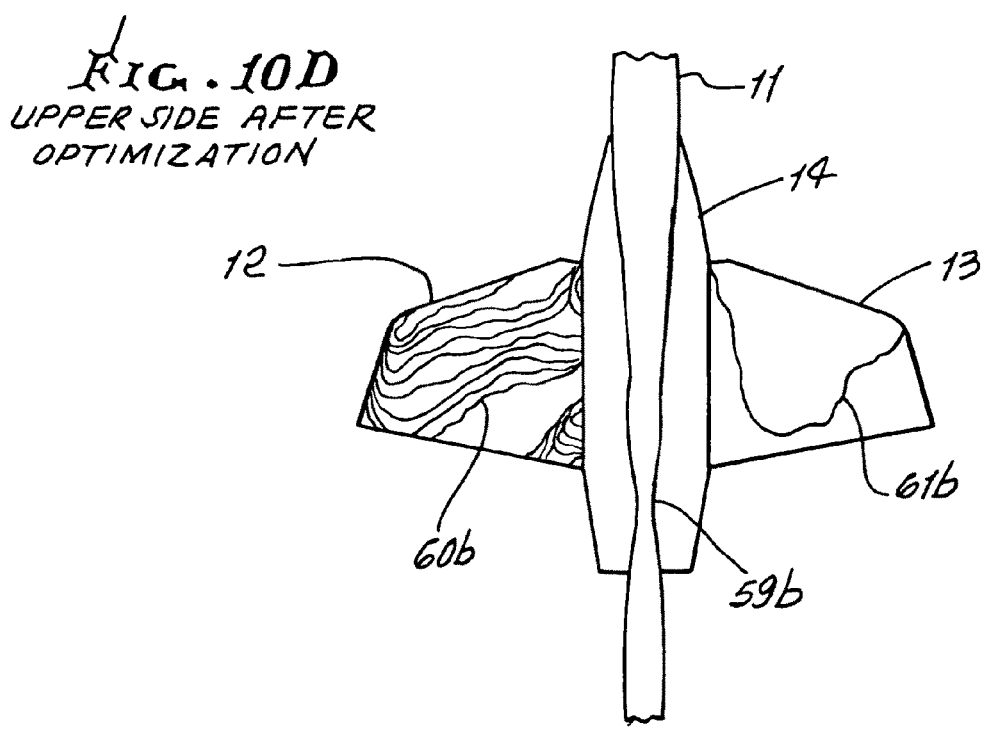

The fuselage pressure distributions affect the pressure gradients on the wing and consequently the BL stability, as the result of favorable changes in both cross-flow and streamwise pressure gradients. FIG. 10 illustrates this effect for a case of a wing-fuselage-strake combination of a LF supersonic business jet design at Mach 1.4 and 45,000 ft. Disturbances from the strake and wing leading edges and the fuselage cause waves which can be seen in the wing pressure distributions, and which affect the location of transition from laminar to turbulent BL flow. Further detailed shaping of the fuselage is then performed, either by trial and error, or preferably by means of an optimization algorithm, until the combined wave drag and friction drag is minimized. FIG. 10A shows the lower side of the fuselage 11 and 56a, strake 14, and wing 12 and 13 before laminar flow optimization, and FIG. 10B after. The initial fuselage shapes are indicated at 56a and after optimization at 56b and 56c. The optimization results in lateral narrowing of the lower fuselage at two locations as seen at 56b and 56c, which are roughly aligned with the intersections of the wing leading and trailing edges with the strake, 13a and 13b. These modifications cause pressure changes on the wing as seen by the isobar contours as indicated at 57a before LF optimization and 57b after. The pressure gradients after LF optimization result in a greater extent of laminar flow as indicated by the BL transition locations such as at 58b vs the initial locations at 58a. Similar results are shown for the upper side in FIG. 10C before LF optimization and 10D after LF optimization. The fuselage contours are seen before and after at 59a and 59b, respectively, the isobars at 60a and 60b, and the transition front locations at 61a and 61b, showing increased laminar flow extent. In this example the initial configuration was optimized to minimize wave drag only, which is typical of prior art, sometimes referred to as "area ruling", whereas the final configuration was optimized for maximum LF extent, in order to emphasize the fuselage contour effects on LF extent. In accordance with the present invention the final optimization would typically minimize total drag, rather than LF extent as done in this example. FIG. 10 illustrates two further aspects of the invention. First, when optimizing for reduced wave drag, the fuselage widths below the wing are greater than those above the wing in the region between the wing leading edge and trailing edge intersections with the strake. Second when optimizing for greater laminar flow, the fuselage has reduced widths below the wing in the vicinity of the wing leading edge and trailing edge intersections with the strake, relative to the fuselage widths adjacent to these locations. Thus in FIG. 10B it will be noted that the fuselage has lower elongated extent 70, located inboard of left and right side strakes 14. The fuselage has reduced widths at locations 56b and 56c inboard of the wing leading and trailing edge junctions 13a and 13b with said strakes, and relative to fuselage widths at positions 70a lengthwise between said locations 56b and 56c, thereby to assist in optimizing wing laminar boundary layer flow at aircraft supersonic speeds.

The invention concerns a wing and fuselage configured for extensive wing laminar flow at supersonic cruise, characterized by (a) low wing sweep, to maintain an attached shock at design cruise speed and limit cross-flow pressure gradients to levels consistent with maintaining NLF, (b) biconvex-type airfoils with thickness to chord variation as an average along the span, outboard of the zone of fuselage influence, selected for performance and product value given by, $$\frac{t}{c} \leq 0.024 \times \sqrt{M},$$

(c) leading edges with convex shape, selected to effect NLF, and effective thickness, h, given by, $$\frac{h}{t} \leq 0.05,$$

and (d) fuselage and wing contours which, in combination, reduce the total drag (wave drag plus lift-dependent drag plus skin friction drag) as a result of "area-ruling" and simultaneously achieving pressure distributions on the wing enabling extensive area of NLF.

What is claimed is:

1. A method of providing an aircraft having a fuselage, and a wing configured for extensive laminar flow at design cruise conditions, the method characterized by the steps:
   a) providing wing biconvex-type airfoils having values of thickness, chord and shape along the wing span which provide substantially optimal aircraft range at said design cruise conditions, considering the influences of wing drag and wing weight,
   b) providing wing leading edges, which are configured to effect laminar flow, and
   c) providing fuselage and wing contours which, in combination, produce reduced total wave drag and produce extensive areas of laminar boundary layer flow on the wing,
   d) providing wing sweep angularity that facilitates provision of said a), b) and c),
   e) and said provided airfoils have at span locations a ratio t/c of maximum thickness, t, to chord, c, at such locations, said t/c ratio having value along the span outboard of a zone of fuselage influence, such that the average of said ratio, is given by, $$\frac{t}{c} \leq 0.024 \times \sqrt{M}$$

where M=supersonic design cruise Mach number,
   f) and wherein for values of design cruise Mach number M between 1.3 and 2.8, the corresponding maximum values of t/c are approximately linearly proportional to maximum values between 0.027 and 0.040, where t is airfoil thickness and c is airfoil chord along the wing span outbound of said zone of fuselage influence.

2. The method of claim 1 for which the zone of fuselage influence is defined at the lowest design cruise Mach number as the portion of the wing inboard of a wing station defined by the intersection of Mach lines originating at the intersection of the extended leading and trailing edges of the wing and the aircraft lengthwise plane of symmetry.

3. The method of claim 2 for which the values of thickness and chord along the span are such that the average of said ratio, t/c, outboard of said zone of fuselage influence, is less than about 0.040.

4. The method of claim 1 further characterized by at least one of the following:
   t/c<about 0.027 for design supersonic cruise speed of M about 1.3
   t/c<about 0.034 for design supersonic cruise speed of M about 2.0
   t/c<about 0.040 for design supersonic cruise speed of M about 2.8.

5. The method of claim 1 wherein said fuselage and wing contours combine to produce values of airfoil thickness, chord and shape along the wing span determined by one of the following:
   i) a process in which the aircraft drag and weight, and resulting aircraft range are determined for a number of airfoil variations, and
   ii) other aircraft characteristics or factors, including the shape of the fuselage in the vicinity, and ahead of, the wing.

6. The method of claim 5 wherein said other factors included in said determination include manufacturing cost, equipment installation, ease of access, maintenance and operating cost.

7. The method of claim 5 wherein said other factors include aircraft range at speeds other than the design cruise Mach number, such as for example high subsonic speeds.

8. The method of claim 5 wherein said other factors include aircraft fuel efficiency, in terms of specific range for a particular mission or selected mix of missions.

9. The method of claim 5 wherein said other factors include aircraft landing and takeoff characteristics, and handling qualities associated therewith.

10. The method of claim 1 wherein the biconvex-type airfoils are provided to have, at spanwise locations, a ratio t/c of maximum thickness t to chord c, said t/c ratio lying between about 0.015 and 0.047.

11. The method of claim 10 wherein for a supersonic design cruise Mach number of 1.3, t/c average along the span outboard of fuselage influence is less than 0.027.

12. The method of claim 10 wherein t/c increases by approximately 50% as design cruise Mach number increases between 1.3 and 2.8.

13. The method as defined in claim 1 wherein the wing is further characterized by laminar fraction of about 0.7.

14. An aircraft having a fuselage, and a wing configured for extensive laminar flow at a supersonic design cruise Mach number M, the wing characterized by
   a) leading edge sweep angle low enough to maintain an attached shock at design cruise, but not more than about 20 degrees, and
   b) wing biconvex-type airfoils having values of the ratio of thickness t, to chord c, along the wing span, whereby the average value of said ratio, t/c along the span, outboard of a zone of fuselage influence, is given by the inequality, $$\frac{t}{c} \leq 0.024 \times \sqrt{M},$$

and where said zone of fuselage influence is defined at the design cruise Mach number, M, as the portion of the wing inboard of a wing station defined by the intersection of Mach lines originating at the intersections of the extended leading and trailing edges of the wing and the fuselage plane of symmetry, and
   c) said leading edges having convex shape, and effective thickness, h, defined as the distance between the points of tangency of the leading edge with the upper and lower wing surfaces, at each location along the span such that, h/t is less than about 0.05, where t is the maximum wing thickness at such location, and
   d) fuselage and wing contours which, in combination, provide for reduced wave drag and extensive laminar boundary layer flow on the wing, the former characterized by total aircraft cross-sectional area varying smoothly with longitudinal position relative to the aircraft, and the latter by additionally avoiding abrupt changes in slope and curvature of meridian lines on the fuselage sides adjacent and forward of said wing.

15. The aircraft of claim 14 characterized in that the average of said ratio is given by, $$\frac{t}{c} \leq 0.024 \times \sqrt{M}.$$

16. The aircraft of claim 14 for which the values of thickness and chord along the span are such that the average of said ratio, t/c, outboard of said zone of fuselage influence, is less than about 0.040.

17. The aircraft of claim 14 wherein for values of design cruse Mach number M between 1.3 and 2.8, the corresponding maximum values of t/c are approximately linearly proportional to maximum values between 0.027 and 0.040, where t is airfoil thickness and c is airfoil chord along the wing span outboard of a zone of fuselage influence.

18. The aircraft of claim 17 further characterized by at least one of the following:
 t/c<about 0.027 for design supersonic cruise speed of M about 1.3
 t/c<about 0.034 for design supersonic cruise speed of M about 2.0
 t/c<about 0.040 for design supersonic cruise speed of M about 2.8.

19. The aircraft of claim 14 wherein said fuselage and wing contours combine to produce values of airfoil thickness, chord and shape along the wing span determined by one of the following:
 i) aircraft drag and weight, and resulting aircraft range determined for a number of airfoil variations, and
 ii) other aircraft characteristics or factors, including the shape of the fuselage in the vicinity, and ahead of, the wing.

20. The aircraft of claim 19 wherein said other factors included in said determination include manufacturing cost, equipment installation, ease of access, maintenance and operating cost.

21. The aircraft of claim 19 wherein said other factors include aircraft range at speeds other than the design cruise Mach number.

22. The aircraft of claim 19 wherein said other factors include aircraft fuel efficiency, in terms of specific range for a particular mission or selected mix of missions.

23. The aircraft of claim 19 wherein said other factors include aircraft landing and takeoff characteristics, and handling qualities associated therewith.

24. The aircraft of claim 14 wherein the biconvex-type airfoils are provided to have, at spanwise locations, a ratio t/c of maximum thickness t to chord c, said t/c ratio lying between about 0.015 and 0.047.

25. The aircraft of claim 24 wherein for a supersonic cruise speed of about Mach 1.3, t/c average along the span outboard of fuselage influence is less than 0.027.

26. The aircraft of claim 24 wherein t/c increases by approximately 50% as the design cruise Mach number increases between 1.3 and 2.8.

27. The aircraft as defined in claim 14 wherein the wing is further characterized by laminar fraction of about 0.7.

28. The method of claim 1 wherein said convex leading edges are provided to have an effective thickness dimension between about 0.01 inch and about 0.10 inch.

29. The method of claim 28 wherein said convex leading edge shape is characterized by one of the following:
 i) circular segment,
 ii) elliptical segment,
 iii) blunted circular segment,
 iv) blunted elliptical segment.

30. The aircraft of claim 14 wherein said leading edge effective thickness dimension is between about 0.01 inch and about 0.10 inch.

31. The method of claim 29 wherein said convex leading edge is blunted to optimally extend in a forward direction between circular and elliptical leading edge segments, wherein all of said leading edge segments are tangent to substantially the same biconvex surface portion or portions of the airfoil.

32. The method of claim 31 wherein h/t is less than about 0.05.

33. The method of claim 1 wherein each wing leading edge segment has blunted configuration to optimally extend in a forward direction between forward facing circular and elliptical leading edge segment configurations, wherein all of said leading edge configurations are tangent to substantially the same biconvex surface portions or portions of the airfoil.

34. The aircraft of claim 14 wherein, the fuselage having lower extent inboard of the left side and right side wing leading and trailing edge junctions with left side and right side strakes, said fuselage lower extent having reduced widths at locations inboard of said leading and trailing edge junctions and relative to fuselage widths at positions lengthwise between said locations, thereby to assist in optimizing laminar air flow over the wing at aircraft supersonic speeds.

35. The aircraft of claim 14 wherein, the fuselage having upper and lower extents inboard of the left side and right side wing leading and trailing edge junctions with left side and right side strakes, said fuselage lower extent having greater widths at locations between said leading and trailing edge junctions than fuselage upper extent at positions lengthwise between said locations, thereby to assist in optimizing wave drag at aircraft supersonic speeds.

36. An aircraft having a fuselage, and a wing configured for extensive laminar flow at a supersonic design cruise Mach number M, the wing characterized by
 a) leading edge sweep angle low enough to maintain an attached shock at design cruise, but not more than about 20 degrees, and
 b) wing biconvex-type airfoils having values of the ratio of thickness t, to chord c, along the wing span, whereby the average value of said ratio, t/c along the span, outboard of a zone of fuselage influence, is given by the inequality, $$\frac{t}{c} \le 0.024 \times \sqrt{M},$$

and where said zone of fuselage influence is defined at the design cruise Mach number, M, as the portion of the wing inboard of a wing station defined by the intersection of Mach lines originating at the intersections of the extended leading and trailing edges of the wing and the fuselage plane of symmetry, and
 c) said leading edges having convex shape, and effective thickness, h, defined as the distance between the points of tangency of the leading edge with the upper and lower wing surfaces, at each location along the span such that, h/t is less than about 0.05, where t is the maximum wing thickness at such location, and
 d) fuselage and wing contours which, in combination, provide for reduced wave drag and extensive laminar boundary layer flow on the wing, the former characterized by total aircraft cross-sectional area varying smoothly with longitudinal position relative to the aircraft, and the latter by additionally avoiding abrupt changes in slope and curvature of meridian lines on the fuselage sides adjacent and forward of said wing.

37. An aircraft having a fuselage, and a wing configured for extensive laminar flow at design cruise design cruise conditions, the wing characterized by
 a) wing biconvex-type airfoils having values of thickness, chord and shape along the wing span which provide substantially optimal aircraft range at said design cruise conditions, considering the influences of wing drag and wing weight, b) leading edges having convex shape, and effective thickness, h, defined as the distance between the points of tangency of the leading edge with the upper and lower wing surfaces, at each location along the span such that, h/t is less than about 0.05, where t is the maximum wing thickness at such location, c) the fuselage and wing having contours which together provide for a combination of reduced wave drag and extensive laminar boundary layer flow on the wing, the former characterized by total aircraft cross-sectional area varying smoothly with longitudinal position relative to the aircraft, and the latter by additionally avoiding abrupt changes in slope and curvature of meridian lines on the fuselage sides adjacent and forward of said wing, d) the wing having sweep angularity that facilitates said a), b) and c), e) said airfoils having at span locations a ratio t/c of maximum thickness, t, to chord, c, at such locations, said t/c ratio having value along the span outboard of a zone of fuselage influence, such that the average of said ratio is given by, $$\frac{t}{c} \leq 0.024 \times \sqrt{M}.$$

* * * * *